United States Patent
Koelewyn et al.

(10) Patent No.: US 12,499,235 B2
(45) Date of Patent: Dec. 16, 2025

(54) ITERATIVE BOOT QUEUE

(71) Applicant: ATI Technologies ULC, Markham (CA)

(72) Inventors: Erez Koelewyn, Markham (CA); Kamraan Nasim, Markham (CA)

(73) Assignee: ATI Technologies ULC, Markham (CA)

( * ) Notice: Subject to any disclaimer, the term of this patent is extended or adjusted under 35 U.S.C. 154(b) by 340 days.

(21) Appl. No.: 17/564,444

(22) Filed: Dec. 29, 2021

(65) Prior Publication Data

US 2023/0205886 A1   Jun. 29, 2023

(51) Int. Cl.
| | |
|---|---|
| G06F 21/57 | (2013.01) |
| G06F 9/4401 | (2018.01) |
| G06F 11/362 | (2025.01) |
| G06F 11/3698 | (2025.01) |
| G06F 21/54 | (2013.01) |

(52) U.S. Cl.
CPC .......... *G06F 21/575* (2013.01); *G06F 9/4406* (2013.01); *G06F 11/362* (2013.01); *G06F 11/3698* (2025.01); *G06F 21/54* (2013.01)

(58) Field of Classification Search
CPC .... G06F 11/3664; G06F 21/54; G06F 21/575; G06F 9/4403; G06F 9/4406; G06F 9/4411; G06F 11/3055; G06F 11/3051; G06F 11/3003; G06F 11/30; G06F 21/50; G06F 21/57
See application file for complete search history.

(56) References Cited

U.S. PATENT DOCUMENTS

| | | | |
|---|---|---|---|
| 5,828,888 A | 10/1998 | Kozaki et al. | |
| 5,912,979 A | 6/1999 | Gavrilos | |
| 6,189,100 B1 | 2/2001 | Barr et al. | |
| 6,195,587 B1 | 2/2001 | Hruska et al. | |
| 6,340,977 B1 | 1/2002 | Lui et al. | |
| 7,296,143 B2 | 11/2007 | Gaskins et al. | |
| 7,412,597 B2 * | 8/2008 | Zhou ................... | G06F 9/4401 713/1 |
| 7,908,466 B2 | 3/2011 | Oh et al. | |
| 9,009,457 B2 | 4/2015 | O'Mullan et al. | |
| 10,649,790 B1 | 5/2020 | Ingegneri | |
| 10,725,803 B1 | 7/2020 | Zhu | |
| 12,026,520 B2 | 7/2024 | Nasim et al. | |
| 2002/0032769 A1 | 3/2002 | Barkai et al. | |

(Continued)

*Primary Examiner* — Olugbenga O Idowu
(74) *Attorney, Agent, or Firm* — Kowert, Hood, Munyon, Rankin & Goetzel, P.C.; Rory D. Rankin

(57) ABSTRACT

A system and method for efficiently performing a bootup operation are described. In various implementations, an integrated circuit includes at least one or more processors and on-chip memory. The on-chip memory has a higher security level than off-chip memory. One of the one or more processors is designated as a security processor. During the processing of the multiple boot steps of a bootup operation, the security processor receives one or more out of band (OOB) events that are not included in the bootup operation. The security processor initializes both an OOB queue and a main boot queue in the on-chip memory. The security processor stores boot steps of the bootup operation in the main boot queue and stores received OOB events in the OOB queue. The security processor executes at least one OOB event prior to completing the bootup operation.

20 Claims, 5 Drawing Sheets

(56) References Cited

U.S. PATENT DOCUMENTS

| | | |
|---|---|---|
| 2002/0166061 A1 | 11/2002 | Falik et al. |
| 2004/0015709 A1 | 1/2004 | Chen et al. |
| 2007/0028244 A1 | 2/2007 | Landis et al. |
| 2007/0288761 A1 | 12/2007 | Dale et al. |
| 2008/0176588 A1 | 7/2008 | Ashdown et al. |
| 2008/0295111 A1 | 11/2008 | Craft et al. |
| 2009/0249055 A1 | 10/2009 | Itoh |
| 2009/0259854 A1 | 10/2009 | Cox et al. |
| 2009/0328195 A1 | 12/2009 | Smith |
| 2010/0174696 A1 | 7/2010 | Dixon et al. |
| 2013/0091260 A1* | 4/2013 | Murphy .................. G06F 8/654 709/221 |
| 2014/0244991 A1* | 8/2014 | Akdemir ............... G06F 9/4406 713/2 |
| 2015/0317495 A1 | 11/2015 | Rodgers et al. |
| 2016/0300064 A1 | 10/2016 | Stewart et al. |
| 2016/0342439 A1 | 11/2016 | Woerndle et al. |
| 2019/0339888 A1 | 11/2019 | Sasidharan et al. |
| 2020/0073580 A1 | 3/2020 | Frolikov |
| 2020/0394359 A1 | 12/2020 | Fitzgerald et al. |
| 2021/0026971 A1 | 1/2021 | Hellwig et al. |
| 2023/0195926 A1 | 6/2023 | Mehta et al. |

* cited by examiner

ITERATIVE BOOT QUEUE

BACKGROUND

Description of the Relevant Art

A reboot of a computing system occurs for one of a variety of reasons. For example, a system administrator or user requests a reboot, a failover process switches data storage controllers for managing a storage subsystem due to failure of the original data storage controller, a reboot automatically occurs during recovery from a power outage, and so on. Whatever the reason, it is possible that the boot sequence consumes an appreciable amount of time. During this time, the computing system is unresponsive to a variety of events. Examples of these events are an intercommunication request between processors when multiple processors are used, a security unlock request used during debugging, a server reliability, availability, and serviceability (RAS) recovery request, other interrupts, and so on. This period of time of the computing system being unresponsive to these events is referred to as a "blackout window." In a worst-case scenario, a system administrator or user cannot recover the computing system via a warm reset at all as the computing system hangs somewhere within the bootup operation. In this case, a cold reset or power cycle may be required to recover the system which will be service impacting. In other cases, the bootup operation still consumes a significant amount of time, which costs a significant amount of money in downtime when the computing system is used to provide critical applications and services.

In view of the above, methods and systems for efficiently performing a bootup operation are desired.

Figure 1:
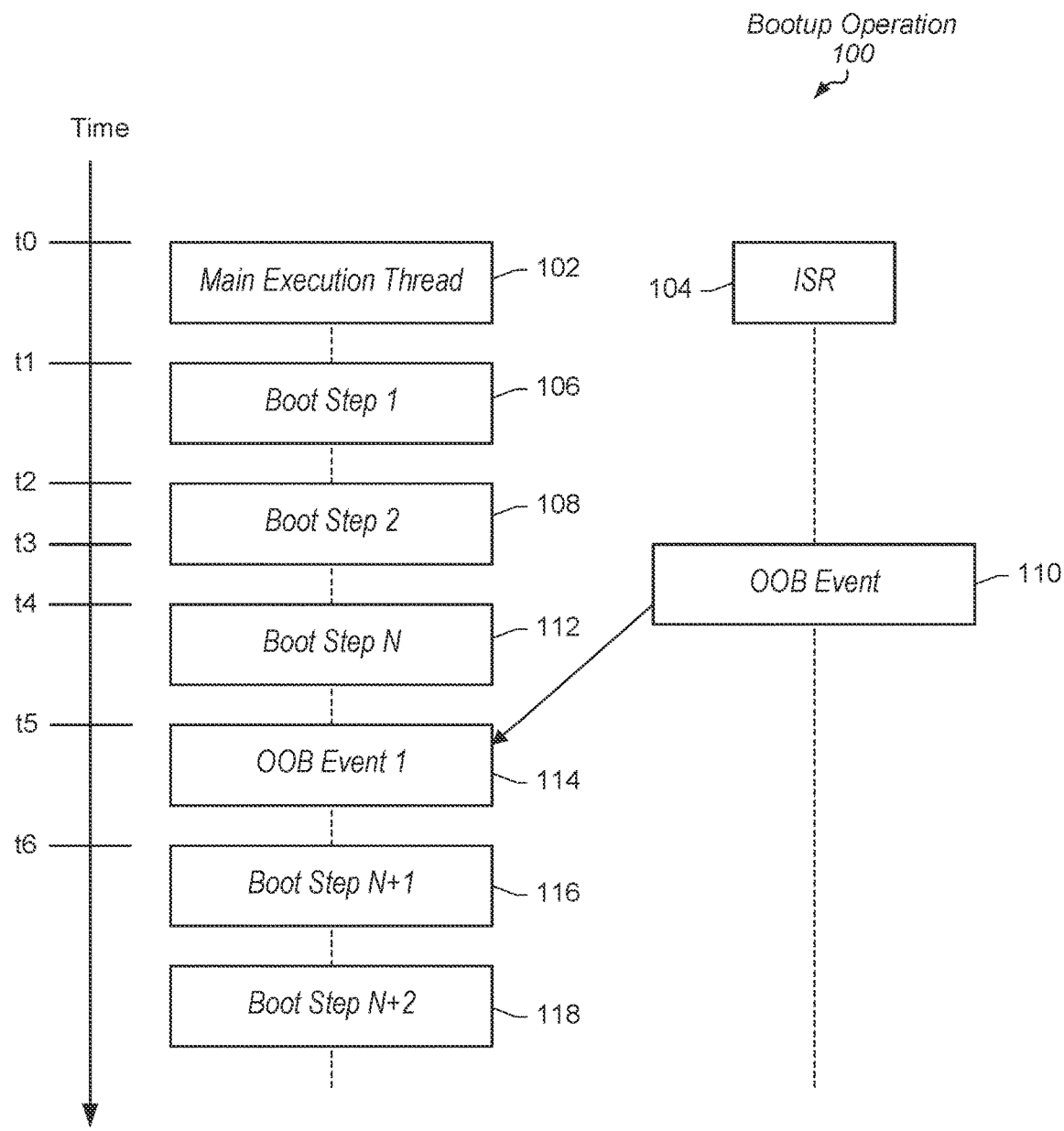
FIG. 1 is a generalized diagram of one implementation of a bootup operation.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for efficiently performing a bootup operation are contemplated. In various implementations, a computing system includes at least one or more processors and on-chip memory. The on-chip memory has a higher security level than off-chip memory. One of the one or more processors is designated as a security processor for the computing system. One of the many activities that the security processor performs for the computing system is executing a bootup operation. During the processing of the multiple boot steps of the bootup operation, the security processor receives one or more out of band (OOB) events that are not included in the bootup operation. Examples of the OOB events are an intercommunication request between processors when multiple processors are used, an SoC (system on a chip) security unlock request received via a JTAG (Joint Test Action Group) interface used during debugging, an SoC on-chip memory (e.g., IP SRAM) and off-chip (e.g., DRAM) ECC (Error Correction Coding) notification, a power management interrupt or other interrupts and a server reliability, availability, and a serviceability (RAS) recovery request. The security processor executes at least one OOB event prior to completing the bootup operation.

The security processor initializes an OOB queue in the on-chip memory. The OOB queue includes multiple entries with each entry capable of storing at least an indication of an OOB event. The security processor also initializes a main boot queue with multiple entries with each entry capable of storing at least an indication of a boot step. The security processor executes the boot steps stored in the main boot queue. In various implementations, the main boot queue is organized as a first-in, first-out (FIFO queue, and the security processor executes the boots steps of the bootup operation in order. When the security processor receives an OOB event while processing the boot steps, the security processor stores at least an indication of the OOB event in an available entry of the OOB queue.

The security processor executes an OOB event stored in the OOB queue when the security processor determines that a current boot step has completed and the OOB is occupied (not empty). The security processor executes a subsequent boot step with at least an indication stored in the main boot queue when the security processor determines that a previous boot step has completed and the OOB queue is empty. Therefore, the security processor is able to handle OOB events in a dynamic manner before the bootup operation completes. Accordingly, some increased degree of access to the system is possible during the bootup sequence, which reduces the impact of the blackout window and enhances the ability of users and/or system administrators to manage the system (or a plurality of systems) and reduce the service impacts.

Turning now to FIG. 1, a generalized block diagram of a bootup operation 100 is shown. As shown, a processor executes a series of boot steps 106-118 as a single main execution thread 102 during the bootup operation 100 of a computing system. Each of the boot steps 106-112 and 116-118 includes multiple instructions corresponding to multiple boot actions. The processor (not shown) begins the main execution thread of the bootup operation for one of a variety of reasons. For example, a system administrator or user requests a reboot or a cold boot, a failover process switches data storage controllers for managing a storage subsystem due to failure of the original data storage controller, a reboot automatically occurs during recovery from a power outage, and so on. In some implementations, the processor is a dedicated security processor of the computing system. In some implementations, the security processor is a coprocessor within a central processing unit (CPU), a graphics processing unit (GPU), one of a variety of types of an application specific integrated circuit (ASIC), a digital signal processor (DSP), a multimedia engine, or other.

Prior to initiating execution of the main execution thread 102, the processor identifies and tests hardware components corresponding to a hardware configuration of the computing system. Afterward, the processor searches for a first-level boot loader (BL), finds it, loads it, and executes it. While the hardware, such as circuitry, of the processor executes the first-level boot loader, the hardware of the processor finds, loads, and executes a second-level boot loader. By finding, loading, and executing the second-level boot loader, the hardware of the processor transitions execution to the second-level boot loader. In an implementation, when the second-level loader is being executed, the processor begins execution of the main execution thread 102. In other implementations, another particular boot loader is used other than a second-level boot loader to begin execution of the main execution thread 102.

At this point in time, the processor initializes a main boot queue and an out of band queue (OOB) in memory, such as on-chip memory, if these steps have not already been performed. When executing the particular boot loader, such as the second-level boot loader or other, the processor stores at least an indication of the boot steps in the main boot queue. For example, the processor accesses one or more corresponding storage devices and stores at least corresponding indications of the boot steps 106-112 and 116-118 that are to be performed to complete the bootup operation. In an implementation, the processor stores, in the main boot queue, a copy of the firmware instructions corresponding to the boot steps 106-112 and 116-118 that perform the bootup operation. In other implementations, the processor stores an indication of a series of boot actions of a particular boot step and stores an indication of the storage device that stores the instructions of the particular boot step. Therefore, the actual instructions of the particular boot step are loaded at a point in time after the main boot queue is initialized and updated.

The boot steps 106-112 and 116-118 include boot actions. Examples of the boot actions are initializing a frame buffer implemented as DRAM storage for the GPU, implementing communication protocols between processing units, and other steps of a secure boot process such as an SoC secure boot process. A timeline is shown along a y-axis where different points in time are shown. At the point in time t0 (or time t0), the second-level boot loader is run, and the main execution thread 102 begins.

At time t1, the processor begins execution of the first boot step 106. At the end of the first boot step 106, the processor checks an out of band (OOB) queue to determine if the OOB queue stores at least an indication of any pending (outstanding) OOB events. In various implementations, each of the boot steps 106-112 and 116-118 includes instructions to check the OOB queue upon completion of its boot actions. For example, during execution of these boot steps 106-112 and 116-118 in the main execution thread 102 by the processor, the processor receives one or more out of band (OOB) events.

The OOB events are interrupts and messages generated during the bootup operation, but they are not included among the boot actions of the boot steps 106-112 and 116-118. Examples of the OOB events are intercommunication requests between processors, such as a CPU and a GPU, when multiple processors are used and being booted, a security unlock request used during debugging, an interrupt service routine of a particular interrupt, a server RAS recovery request, and so on. As shown, an interrupt service routine (ISR) path 104 handles interrupts and other types of messages and routines simultaneously with execution of the main execution thread 102.

After completion of the boot step 106, the processor checks the OOB queue. The processor determines the OOB queue is empty. As a result, at time t2, the processor begins execution of the second boot step 108 in the main execution thread 102. Similarly, after completion of the boot step 108, the processor checks the OOB queue. Since each of the boot steps 106-112 and 116-118 includes instructions to check the OOB queue upon completion of its boot actions, the OOB queue is also referred to as an "iterative queue."

In one example, at time t3, the processor receives the OOB event 110. The processor is still executing the boot actions of the boot step 108. In response, the processor stores at least an indication of the received OOB event 110 in the OOB queue. In another implementation, the processor locates and stores the instructions of the received OOB event 110 in the OOB queue. In some implementations, the processor authenticates the instructions of the OOB event prior to storing the indication or the actual instructions of the OOB event in the OOB queue.

In the illustrated implementation, although the OOB event 110 occurs at time t3, the processor does not store at least an indication of the OOB event 110 in the OOB queue until after time t4. Therefore, upon the completion of each of the boot steps 106 and 108, the processor checks the OOB queue and determines the OOB queue is empty. As a result, the processor moves on to boot step 112 that has at least an indication stored in the main boot queue. However, upon completion of the boot step 112, the processor determines the OOB queue is now occupied. As a result, the processor begins execution at time t5 within the main execution thread 102 of the OOB event 114 stored in the OOB queue. The OOB event 114 corresponds to the received OOB event 110.

After completion of the OOB event 114, the processor again checks the OOB queue. If the processor determines that another OOB event is stored in the OOB queue, then the processor executes the other OOB event. By doing so, the processor prioritizes execution of the OOB events over the next boot step with at least an indication stored in the main boot queue such as boot step 116. When the processor determines the OOB queue is empty, the processor moves on to boot step 116 that has at least an indication stored in the main boot queue. At time t6, the processor begins execution of the boot step 116.

In some implementations, the selected boot step, such as boot step 112, iterates two or more times before completing. Rather than waiting until the multiple iterations of the selected boot step 112 completes, in an implementation, upon completion of an iteration of the selected boot step 112, the processor executes the OOB event 114. Therefore, the processor executes the OOB event 114 in the main execution thread 102 before executing a next iteration of the boot step 112. Again, if the OOB queue stores other OOB events in addition to the OOB event 110, the processor executes these other OOB events in the main execution thread 102 before executing a next iteration of the boot step 112. By doing so, the processor prioritizes execution of the OOB events over the next iteration of the boot step 112. By executing at least one OOB event in the main execution thread 102 before completing the boots steps 106-112 and 116-118 of the bootup operation, the processor reduces the latency of the bootup operation, reduces the size of outstanding code to execute during the bootup operation, and provides access to the hardware of the integrated circuit during a debugging or other process.

Figure 2:
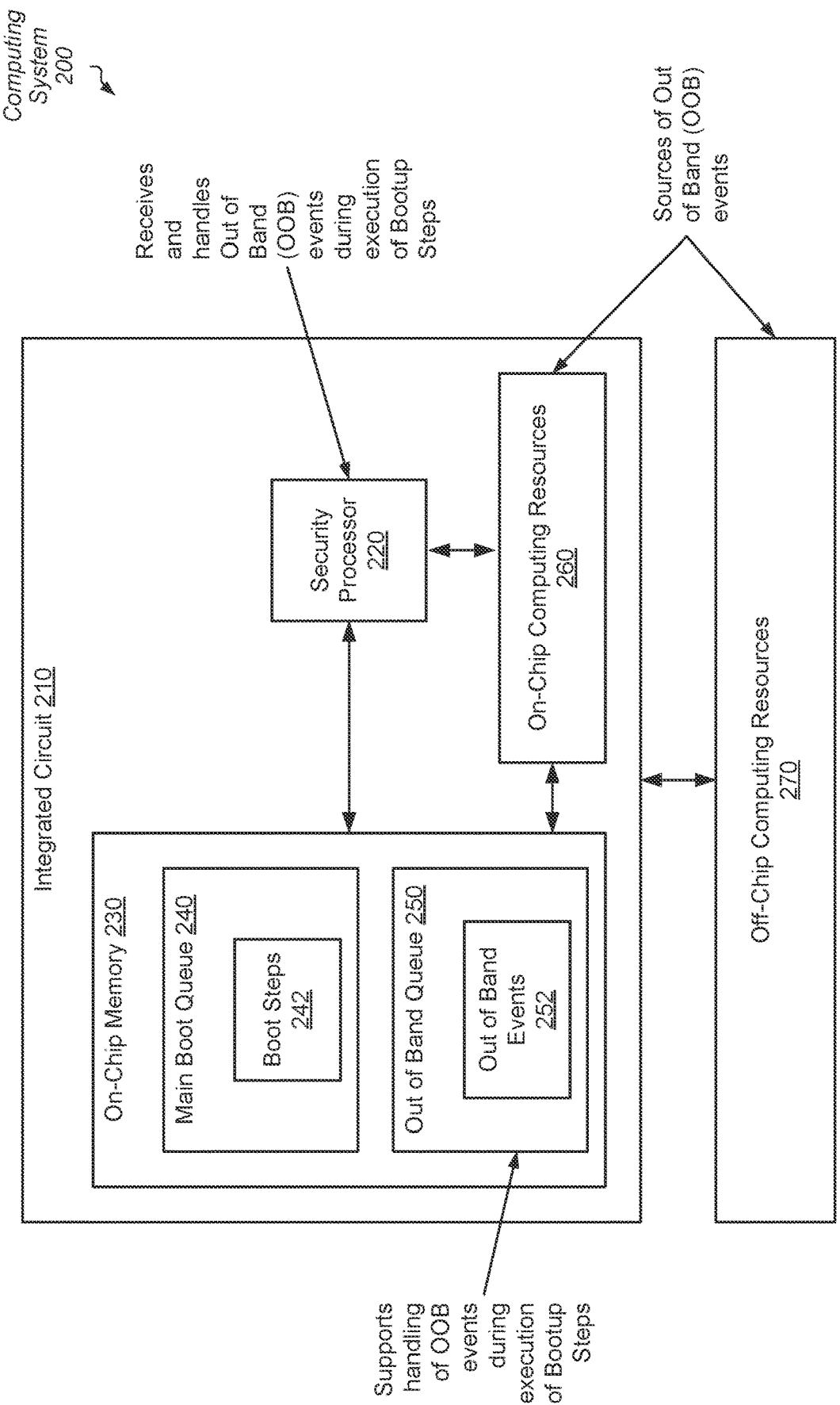
FIG. 2 is a generalized diagram of one implementation of a computing system.

Turning now to FIG. 2, a generalized block diagram of a computing system 200 is shown. The computing system 200 is used in any of a variety of computing devices such as a server used to provide critical applications and services, a desktop computer, a laptop, one of a variety of types of embedded computing devices and mobile computing devices, or other types of computing devices benefitting from aspects of the invention(s) described herein. As shown, the computing system 200 includes an integrated circuit 210 and off-chip computing resources 270 that are located externally from the integrated circuit 210. The integrated circuit 210 includes on-chip memory 230, a security processor 220, and other on-chip computing resources 260. Examples of the integrated circuit 210 are a system on a chip (SoC), an accelerated processing unit (APU) that includes a central processing unit (CPU) and a graphics processing unit (GPU), one of a variety of types of an application specific integrated circuit (ASIC), a digital signal processor (DSP), or other. In some implementations, the functionality of the computing system 200 is incorporated on a system on chip (SoC). In other implementations, the functionality of the computing system 200 is incorporated on a peripheral card inserted in a motherboard. Although a single integrated circuit 210 is shown, the computing system 200 uses another number of integrated circuits in other implementations.

Each of the on-chip computing resources 260 and the off-chip computing resources 270 include a variety of components that provide particular functionality in the computing system 200. These components are not shown for ease of illustration. Examples of these components are a power manager, a communication fabric and/or system buses, a memory controller, a network interface unit, an input/output interface unit for communicating with external peripheral devices, one or more phased locked loops (PLLs) and other clock generation circuitry, temperature sensors and current sensors, and one or more other sensors for interfacing with a button, a touch screen, a keyboard, a pointing device, a camera, and so forth.

In various implementations, the off-chip computing resources 270 also include off-chip memory. Examples of the off-chip memory are a variety of types of dynamic random access memory (DRAM), disk memory such as hard disk drives (HDDs) or solid-state disks (SSDs), and remote memory located across a network. The remote memory can include DRAM or a disk drive (e.g., a HDD or a SSD) within a server used for Cloud-based storage. The off-chip computing resources 270 can also include one or more of a variety of types of read only memory (ROM) such as a boot flash chip and a secure digital (SD) card. The off-chip memory can include one or more of a file allocation table (FAT) and a master boot record (MBR) that stores code used for bootup operations.

Although a single on-chip memory is shown, in various implementations, the integrated circuit 210 includes multiple on-chip memories. An example of the on-chip memories in the integrated circuit 210 are a variety of static random access memory (SRAM) used as different levels of a cache memory subsystem. Another example of the on-chip memories in the integrated circuit 210 is one of a variety of types of ROM such as flash memory. In various implementations, the security processor 220, the on-chip memory 230, and protected security firmware form a security subsystem for the integrated circuit 210. The protected firmware is stored in one of the security processor 220 and the on-chip memory 230 and executed by the security processor 220. This security subsystem provides a software and hardware root-of-trust to help secure the processing and storage of trusted applications and corresponding sensitive data. The security subsystem manages the bootup operation, monitors activities of the integrated circuit 210 for suspicious actions, and performs security related operations such as performing encryption and cryptographic functions.

In some implementations, the security processor 220 is a dedicated processor, coprocessor or microcontroller used within the security subsystem, but not used for other functions. For example, the security processor 220 performs services independently from applications executed by a CPU, a GPU, a multimedia engine and other types of processing units in the integrated circuit 210. In other implementations, the security processor 220 is a coprocessor or microcontroller within a CPU, a GPU or other processing unit of the integrated circuit 210. In yet other implementations, the security processor 220 is one or more dedicated processor cores of the CPU, one or more dedicated compute units of the GPU, or other dedicated hardware within a processing unit of the integrated circuit 210. In an implementation, direct access of the security processor 220 is prevented, and communication with the security processor 220 includes using an inbox and an outbox messaging mechanism.

A reboot of the computing system 200 occurs for one of a variety of reasons. For example, a system administrator or user requests a reboot or a cold boot, a failover process switches data storage controllers for managing a storage subsystem due to failure of the original data storage controller, a reboot automatically occurs during recovery from a power outage, and so on. The security processor 220 executes basic input output (BIOS) firmware and accesses a hardware configuration of the computing system 200 and tests one or more hardware components during a power-on self-test (POST). The hardware configuration of the computing system 200 includes at least a processor architecture, the input/output (I/O) ports for connected peripheral devices and storage devices, an amount of on-die r memory and an amount of off-chip memory, power management features, and so forth. Alternatively, firmware using Unified Extensible Firmware Interface (UEFI) standard is used over BIOS.

After successful testing of the hardware, the security processor 220, while executing firmware, traverses a list of storage devices in a particular order to search for a first-level boot loader (BL). Typically, the first-level boot loader is located in a master boot record (MBR) of a particular storage device in the list of storage devices. The security processor 220 loads the first-level bootloader, such as the MBR, into random access memory (RAM) on the integrated circuit 210. In some implementations, the integrated circuit 210 includes both a CPU and a GPU such as when the integrated circuit 210 is implemented as an APU or a SoC. Therefore, the bootup operation operates on each of the CPU and the GPU of the integrated circuit 210 concurrently and there are synchronization points where the CPU and the GPU communicate with each other during the bootup operation.

The first-level boot loader reads a partition table, checks which partitions are active, and loads subsequent second-level bootloader. For example, the first-level bootloader locates and loads a second-level bootloader. At this point in time, the security processor 220 initializes the main boot queue 240 and the out of band queue 250 in the on-chip memory 230 if these steps have not already been performed.

The security processor 220 stores at least an indication of the boot steps 242 in the main boot queue 240. For example, the security processor 220 accesses one or more corresponding storage devices and stores at least an indication of the boot steps 242 that are to be performed to complete the bootup operation.

In an implementation, the security processor 220 stores a copy of the firmware instructions corresponding to the boot steps 242 that perform the bootup operation to completion. In other implementations, the security processor 220 stores an indication of a series of boot actions of a particular boot step and stores an indication of the storage device that stores the instructions of the particular boot step. Therefore, the actual instructions of the particular boot step are loaded at a point in time after the main boot queue 240 is initialized and updated. In some implementations, the security processor 220 authenticates the instructions of the boot step prior to storing the indication or the actual instructions of the boot step among the boot steps 242 in the main boot queue 240.

In an implementation, the boot actions corresponding to the boots steps 242 include boot actions from verification of the hardware configuration to completion of the bootup operation when a secure operating system (OS) is loaded and executed by the security processor 220. In an implementation, the boot actions corresponding to the boots steps 242 include the boot steps of the second-level boot loader. The boots steps 242 include boot actions such as initializing a frame buffer implemented as DRAM storage for the GPU, implementing communication protocols between processing units, and other steps of a secure boot process such as an SoC secure boot process. In other implementations, another boot loader is used other than a second-level boot loader to perform the boot actions corresponding to the boot steps 242.

In various implementations, the security processor 220 executes the boot steps 242 in an in-order manner. During execution of the boot steps 242 by the security processor 220, the security processor 220 receives one or more out of band (OOB) events. Examples of the OOB events are an intercommunication request between processors, such as a CPU and a GPU, when multiple processors are used and being booted, a security unlock request used during debugging, a server RAS recovery request, other interrupts, and so on. In an implementation, the security processor 220 stores at least an indication of the received OOB event among the OOB events 252 in the OOB queue 250. In another implementation, the security processor 220 locates and stores the instructions of the received OOB event among the OOB events 252 in the OOB queue 250. In some implementations, the security processor 220 authenticates the instructions of the OOB event prior to storing the indication or the actual instructions of the OOB event among the OOB events 252 of the OOB queue 250.

In various implementations, the security processor 220 processes at least one of the OOB events 252 prior to completing the multiple boot steps 242. In an implementation, the security processor 220 selects a given boot step of boot steps 242, and the security processor 220 executes the multiple boot actions of the selected boot step. Upon completing the selected boot step, the security processor 220 checks the OOB queue 250 to determine whether the OOB queue 250 is empty. If the OOB queue is occupied (non-empty), then the security processor executes at least one of the OOB events 252. For example, the security processor 220 at least begins execution of one of the OOB events 252 before beginning execution of a next one of the boot steps 242.

In another implementation, the security processor 220 completes execution of one of the OOB events 252 before beginning execution of a next one of the boot steps 242. In yet another implementation, the security processor 220 executes each of the OOB events 252 before checking the OOB queue 250 again at a later time. For example, the security processor 220 is able to simultaneously execute instructions of one of the OOB events 252 while executing instructions of one of the boot steps 242. In some implementations, the selected boot step of the boot steps 242 iterates two or more times before completing. Rather than waiting until the multiple iterations of the selected boot step completes, upon completion of an iteration of the selected boots step, the security processor 220 executes one or more of the OOB events 252.

By executing at least one of the OOB events 252 before completing the boots steps 242 of the bootup operation, the security processor 220 allows the security processor 220 to reduce the latency of the OOB events 252. As described earlier, one example of the OOB events 252 is the intercommunication between processors when multiple processors are used. For example, the CPU and the GPU of the integrated circuit 210 boot up in parallel and there are synchronization points where the CPU and the GPU communicate with each other. The CPU and the GPU use a mailbox mechanism that permits requests and responses to be passed between the CPU and the GPU. The messages corresponding to this mailbox mechanism are stored among the OOB events 252.

In one example, the CPU determines whether the second-level bootloader has initialized the GPU to a point where a graphics driver can begin using the GPU. Synchronization between one or more of the CPU and the GPU and a power management unit is also discovered through the mailbox mechanism. By executing at least one of the OOB events 252 before completing the boots steps 242 of the bootup operation, the security processor 220 reduces the latency of the bootup operation, reduces the size of outstanding code to execute during the bootup operation, and provides access to the hardware of the integrated circuit 210 during a debugging process.

Figure 3:
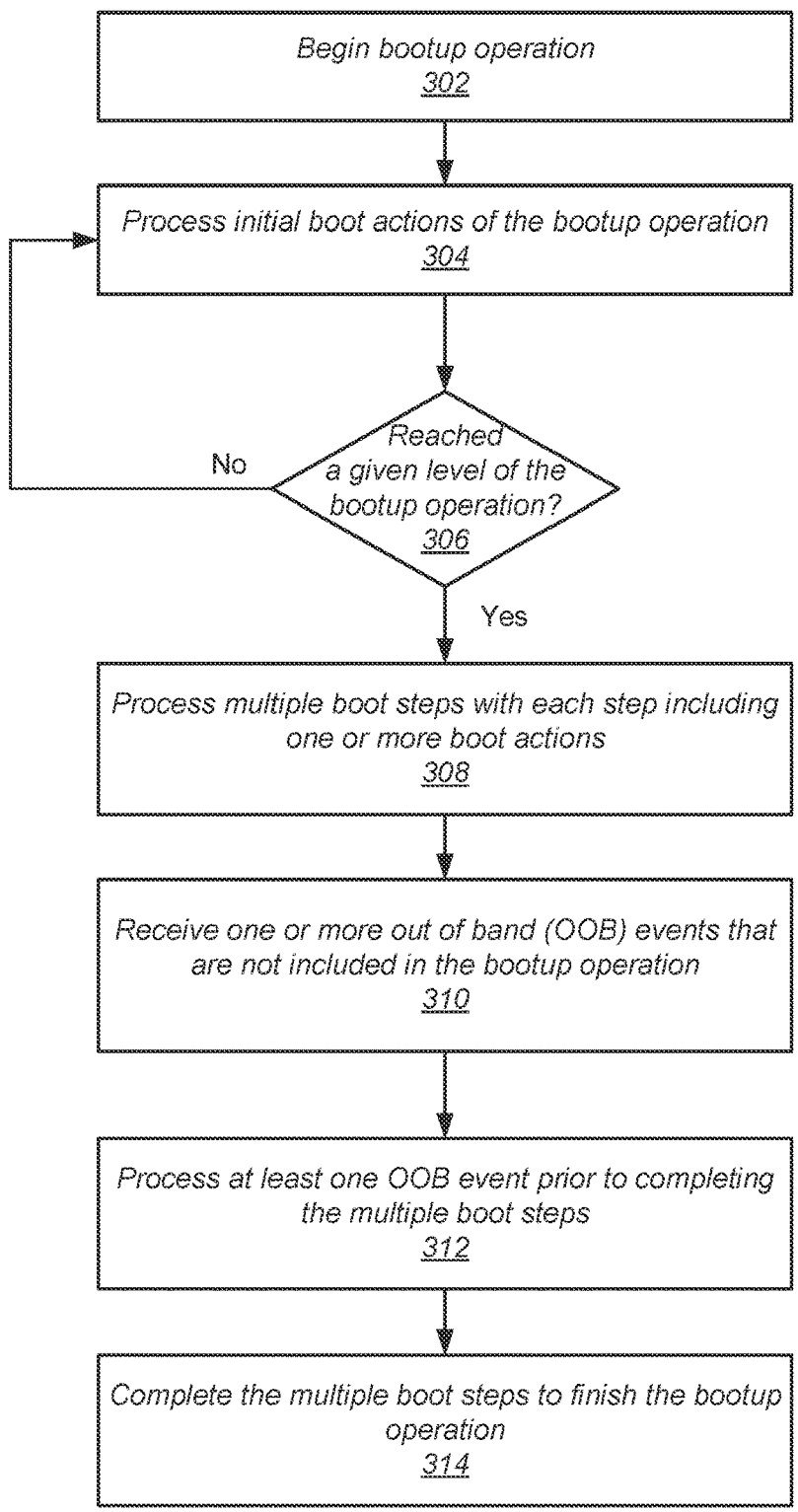
FIG. 3 is a generalized diagram of one implementation of a method for efficiently performing a bootup operation.

Referring now to FIG. 3, one implementation of a method 300 for efficiently performing a bootup operation is shown. For purposes of discussion, the steps in this implementation are shown in sequential order. However, in other implementations some steps occur in a different order than shown, some steps are performed concurrently, some steps are combined with other steps, and some steps are absent.

In various implementations, a computing system includes at least one or more processors and on-chip memory. The on-chip memory has a higher security level than off-chip memory. One of the one or more processors is designated as a security processor for the computing system. Alternatively, a coprocessor or other component within one of the processors is used as the dedicated security processor. One of the many activities that the security processor performs for the computing system is executing a bootup operation. The security processor begins a bootup operation (block 302). The security processor begins the bootup operation for one of a variety of reasons. For example, a system administrator or user requests a reboot or a cold boot, a failover process switches data storage controllers for managing a storage subsystem due to failure of the original data storage controller, a reboot automatically occurs during recovery from a power outage, and so on.

The security processor processes the initial boot actions of the bootup operation (block 304). For example, the security processor identifies and tests hardware components corresponding to a hardware configuration of the computing system. Afterward, the processor searches for a first-level boot loader, finds it, loads it, and executes it. While the hardware, such as circuitry, of the processor executes the first-level boot loader, the hardware of the processor finds, loads, and executes the second-level boot loader. By finding, loading, and executing the second-level boot loader, the hardware of the processor transitions execution to the second-level boot loader. In other implementations, another particular boot loader is used other than the second-level boot loader to execute the boot actions of a main execution thread of the bootup operation.

In an implementation, when the security processor loads the particular boot loader, such as the second-level boot loader or other, the security processor has reached a given level of the bootup operation. If the security processor has not yet reached a given level of the bootup operation ("no" branch of the conditional block 306), then control flow of method 300 returns to block 304 where the security processor processes the initial boot actions of the bootup operation. However, if the security processor has reached the given level of the bootup operation ("yes" branch of the conditional block 306), then the security processor processes multiple boot steps with each step including one or more boot actions (block 308).

The security processor receives one or more OOB events that are not included in the bootup operation (block 310). As described earlier, examples of the OOB events are an intercommunication request between processors, such as a CPU and a GPU, when multiple processors are used and being booted, a security unlock request used during debugging, a server RAS recovery request, other interrupts, and so on. The security processor processes at least one OOB event prior to completing the multiple boot steps (block 312). The security processor completes the multiple boot steps to finish the bootup operation (block 314). By executing at least one of the OOB events before completing the boots steps of the bootup operation, the security processor reduces the latency of the bootup operation, reduces the size of outstanding code to execute during the bootup operation, and provides access to the hardware of the integrated circuit 210 during a debugging process.

Figure 4:
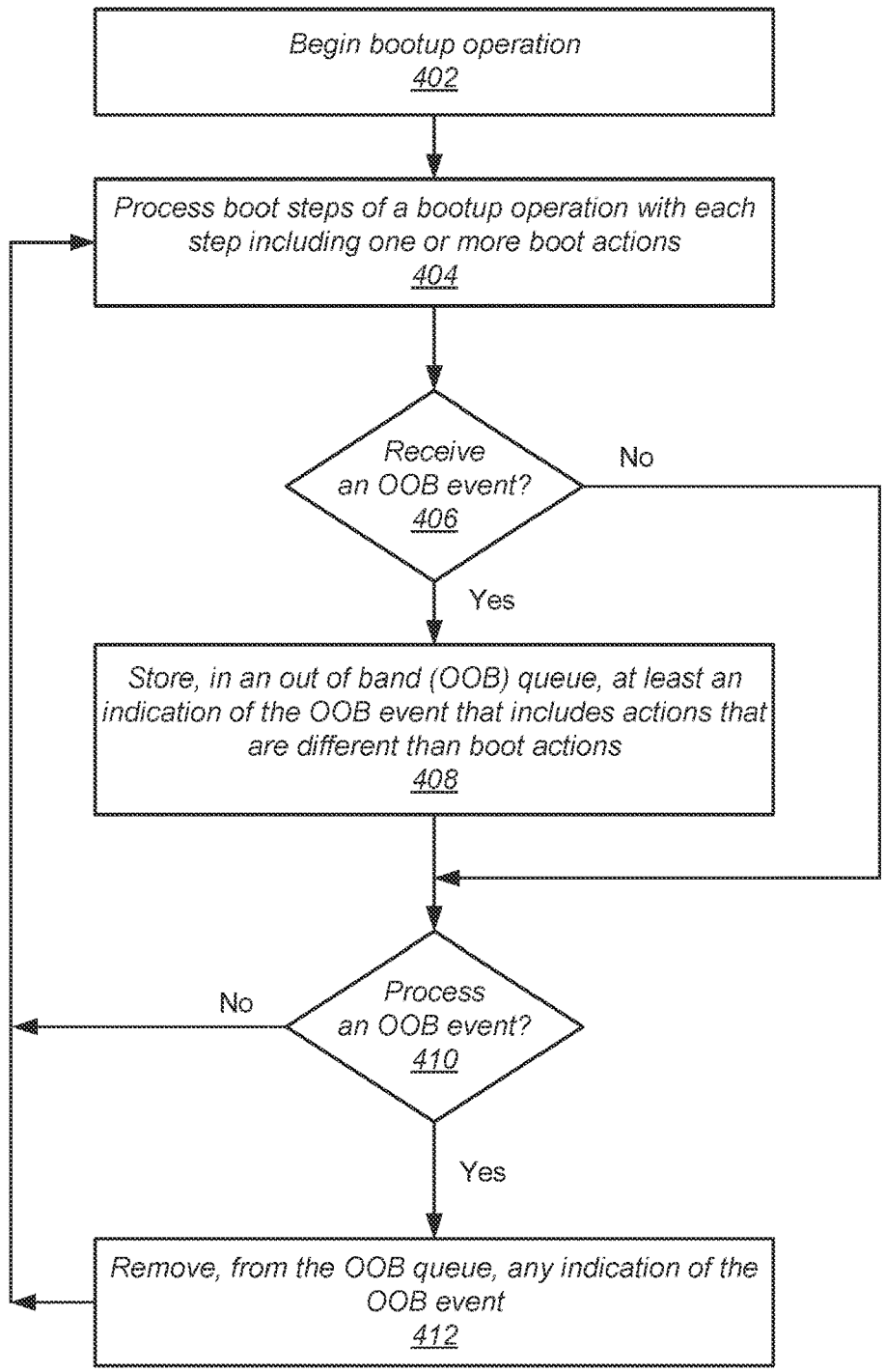
FIG. 4 is a generalized diagram of one implementation of a method for efficiently performing a bootup operation.

Referring now to FIG. 4, one implementation of a method 400 for efficiently performing a bootup operation is shown. A dedicated security processor of a computing system begins a bootup operation (block 302). As described earlier, the security processor begins the bootup operation for one of a variety of reasons. The security processor processes boot steps of a bootup operation with each step including one or more boot actions (block 404). If the security processor receives an out of band (OOB) event ("yes" branch of the conditional block 406), then the security processor stores, in an out of band (OOB) queue, at least an indication of the OOB event that includes actions that are different than boot actions (block 408).

If the security processor does not receive an out of band (OOB) event ("no" branch of the conditional block 406), and the processor does not process an out of band (OOB) event ("no" branch of the conditional block 410), then control flow of method 400 returns to block 404 where the processor processes boot steps of a bootup operation with each step including one or more boot actions. If the processor processes an out of band (OOB) event ("yes" branch of the conditional block 410), then the security processor removes, from the OOB queue, any indication of the OOB event (block 412). Afterward, control flow of method 400 returns to block to where the security processor processes boot steps of a bootup operation with each step including one or more boot actions.

Figure 5:
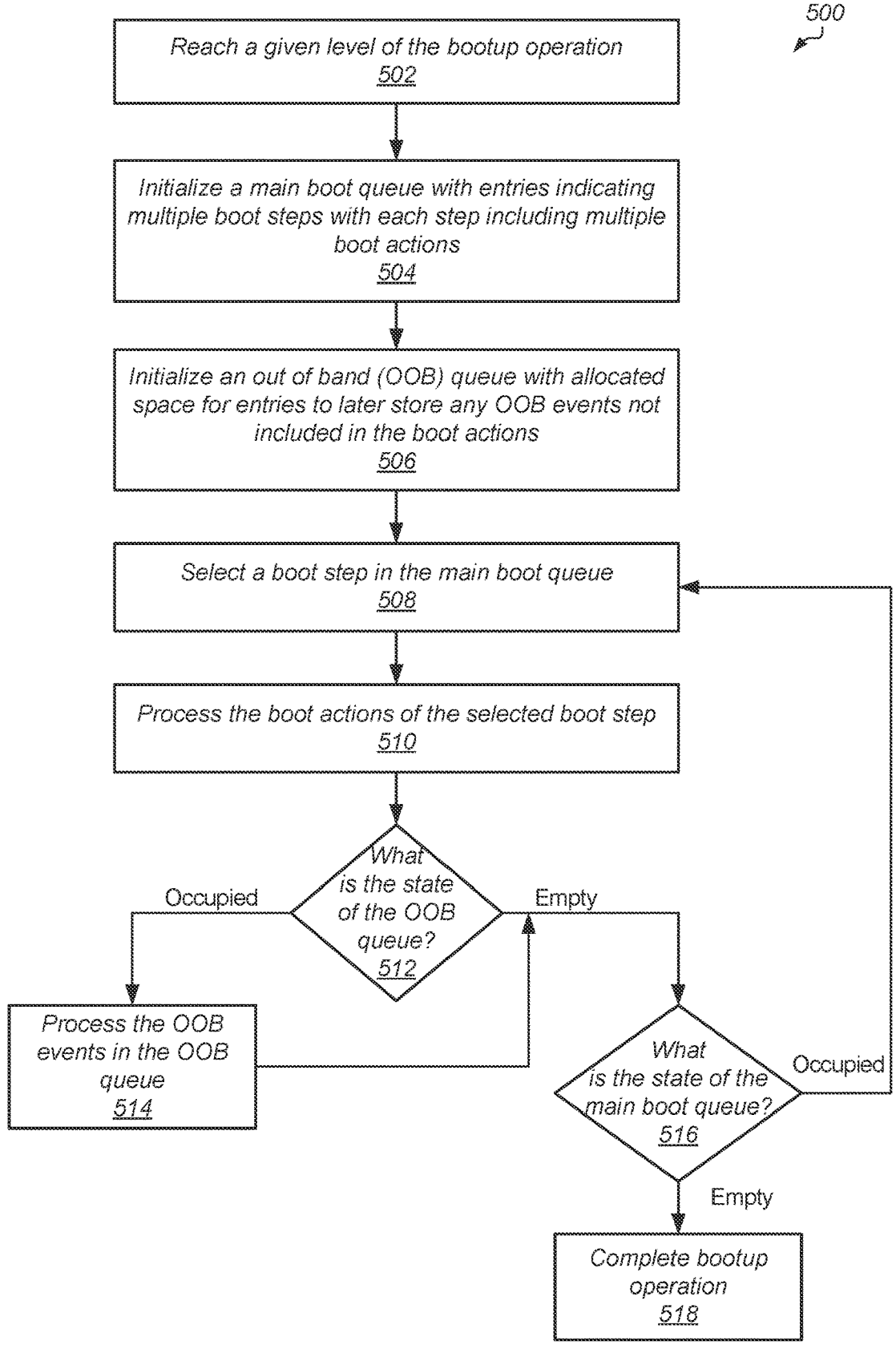
FIG. 5 is a generalized diagram of one implementation of a method for efficiently performing a bootup operation.

Referring now to FIG. 5, one implementation of a method 500 for efficiently performing a bootup operation is shown. A dedicated security processor of a computing system begins a bootup operation. As described earlier, the security processor begins the bootup operation for one of a variety of reasons. In one example, the security processor identifies and tests hardware components corresponding to a hardware configuration of the computing system, and executes a first-level boot loader. Part of the operation of the first-level boot loader is to load a second-level boot loader. In an implementation, when the security processor loads the second-level boot loader, the security processor has reached a given level of the bootup operation (block 502).

The security processor initializes a main boot queue with entries indicating multiple boot steps with each step including multiple boot actions (block 504). The security processor initializes an out of band (OOB) queue with allocated space for entries to later store any OOB events not included in the boot actions (block 506). The security processor selects a boot step in the main boot queue (block 508). The security processor processes the boot actions of the selected boot step (block 510). In various implementations, each of the boot steps includes instructions to check the OOB queue upon completion of its boot actions.

If the security processor determines the state of the OOB queue indicates the OOB is occupied (not empty) ("occupied" branch of the conditional block 512), then the security processor processes the OOB events in the OOB queue (block 514). Afterward, control flow of method 500 moves to conditional block 516 where the processor determines the state of the main boot queue. If the security processor determines the state of the OOB queue indicates the OOB queue is empty ("empty" branch of the conditional block 512), and the processor determines the state of the main boot queue indicates the main boot queue is occupied (non-empty) ("occupied" branch of the conditional block 516), then control flow of method 500 returns to block 508 where the processor selects another boot step that has at least an indication specifying the boot step stored in the main boot queue.

Since each of the boot steps includes instructions to check the OOB queue upon completion of its boot actions, the OOB queue is also referred to as an "iterative queue." For example, the control flow of method 500 iterates through the blocks 508, 510, conditional block 512, block 514, conditional block 516, and return to block 508. However, if the processor determines the state of the main boot queue indicates the main boot queue is empty ("empty" branch of the conditional block 516), then the processor completes the bootup operation (block 518). At this point, the security processor transfer control to a secure operating system. By executing at least one OOB event before completing the boots steps of the bootup operation, the security processor reduces the latency of the bootup operation, reduces the size of outstanding code to execute during the bootup operation, and provides access to the hardware of the integrated circuit during a debugging process.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high-level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   an out of band (OOB) queue comprising a plurality of entries, where each OOB queue entry is configured to store an indication of an OOB event that is not associated with execution of a bootup operation;
   a processor comprising circuitry, wherein the circuitry is configured to:
      process first boot steps of a bootup operation;
      store one or more indications in the OOB queue, responsive to receipt of one or more OOB events that are not associated with execution of the bootup operation; and
      process at least one OOB event indicated in the OOB queue prior to processing second boot steps of the bootup operation, responsive to a determination that the OOB queue contains an indication of the at least one OOB event.

2. The computing system as recited in claim 1, wherein the OOB event comprises a server reliability, availability, and serviceability (RAS) recovery request.

3. The computing system as recited in claim 1, wherein the OOB event comprises a security unlock request used during debugging.

4. The computing system as recited in claim 1, further comprising a plurality of processors in communication with one another and an external memory, wherein the OOB event comprises an intercommunication message between two of the plurality of processors.

5. The computing system as recited in claim 1, further comprising a power management unit, wherein the OOB event comprises a power management interrupt from the power management unit.

6. The computing system as recited in claim 1, wherein the circuitry is further configured to initialize the OOB queue with a plurality of entries in a memory, each entry configured to store an indication of an OOB event.

7. The computing system as recited in claim 6, wherein the circuitry is further configured to initialize a main boot queue with a plurality of entries in the memory, each entry configured to store an indication of a boot step of the bootup operation.

8. The computing system as recited in claim 7, wherein the circuitry is further configured to:
   receive an OOB event while processing the first boot steps of the bootup operation;
   store at least an indication of the OOB event in the OOB queue; and
   process an OOB event stored in the OOB queue, in response to determining:
      the first boot steps have completed; and
      the OOB queue is not empty.

9. A method comprising:
   maintaining, by circuitry, an out of band (OOB) queue comprising a plurality of entries, where each OOB queue entry is configured to store an indication of an OOB event that is not associated with execution of a bootup operation;
   processing, by circuitry of a processor, first boot steps of a bootup operation;
   storing, by the circuitry, one or more indications in the OOB queue, responsive to receipt of one or more OOB events that are not associated with execution of the bootup operation; and
   processing, by the circuitry, at least one OOB event indicated in the OOB queue prior to processing second boot steps of the bootup operation, responsive to a determination that the OOB queue contains an indication of the at least one OOB event.

10. The method as recited in claim 9, wherein the OOB event comprises a security unlock request used during debugging.

11. The method as recited in claim 9, further comprising initializing, by the circuitry, the OOB queue with a plurality of entries, each entry configured to store an indication of an OOB event.

12. The method as recited in claim 11, further comprising:
   receiving, by the circuitry, an OOB event while processing the first boot steps of the bootup operation; and
   storing, by the circuitry, at least an indication of the OOB event in the OOB queue.

13. The method as recited in claim 12, further comprising processing, by the circuitry, an OOB event stored in the OOB queue, in response to determining:
   the first boot steps have completed; and
   the OOB queue is not empty.

14. The method as recited in claim 9, wherein the OOB event comprises a power management interrupt from a power management unit.

15. A processor comprising:
an on chip memory comprising an out of band (OOB) queue;
circuitry of a security processor configured to:
process first boot steps of a bootup operation;
store one or more indications in the OOB queue, responsive to receipt of one or more OOB events that are not associated with execution of the bootup operation; and
process at least one OOB event indicated in the OOB queue prior to processing second boot steps of the bootup operation, responsive to a determination that the OOB queue contains an indication of the at least one OOB event.

16. The processor as recited in claim 15, wherein the at least one OOB event comprises a server reliability, availability, and serviceability (RAS) recovery request.

17. The processor as recited in claim 16, wherein the OOB event comprises a security unlock request used during debugging.

18. The processor as recited in claim 15, wherein the circuitry is further configured to initialize the OOB queue with a plurality of entries, each entry configured to store an indication of an OOB event.

19. The processor as recited in claim 17, wherein the circuitry is further configured to initialize a main boot queue with a plurality of entries, each entry configured to store an indication of a boot step.

20. The processor as recited in claim 18, wherein the circuitry is further configured to:
receive an OOB event while processing the first boot steps of the bootup operation; and
store at least an indication of the OOB event in the OOB queue; and
process an OOB event stored in the OOB queue, in response to determining:
the first boot steps have completed; and
the OOB queue is not empty.

\* \* \* \* \*